United States Patent [19]

Kuo

[11] Patent Number: 5,988,653
[45] Date of Patent: Nov. 23, 1999

[54] AUTO-LOCKING BIT HOLDING SYSTEM OF A HAND TOOL

[75] Inventor: Wen-Chin Kuo, Ta Li, Taiwan

[73] Assignee: Chum Power Machinery Corp., Taichung Hsien, Taiwan

[21] Appl. No.: 09/099,426

[22] Filed: Jun. 18, 1998

[51] Int. Cl.[6] .................................................. B23B 31/12
[52] U.S. Cl. .......................... 279/62; 279/140; 279/150; 279/902
[58] Field of Search .............................. 279/60–65, 140, 279/150, 902

[56] References Cited

U.S. PATENT DOCUMENTS

| | | | |
|---|---|---|---|
| 2,684,856 | 7/1954 | Stoner | 279/61 |
| 4,498,682 | 2/1985 | Glore | 279/60 |
| 4,682,918 | 7/1987 | Palm | 279/60 |
| 4,840,387 | 6/1989 | McCarthy | 279/61 |
| 4,951,955 | 8/1990 | Sakamaki | 279/62 |

*Primary Examiner*—Steven C. Bishop
*Attorney, Agent, or Firm*—Acon & Thomas

[57] ABSTRACT

An auto-locking bit holding system includes a plurality of clamping rods secured by a nut to hold a bit in a transmission block being connected to a transmission shaft of an electric hand tool, a shell covered around the transmission block and the nut, and a locating barrel fastened to the shell to stop the nut inside the shell, wherein: the nut has two projecting blocks at one end; the locating barrel has a body and a plurality of longitudinal locating ribs equiangularly spaced around the periphery of the body; an annular impact member is mounted around the cylindrical transmission block between the nut and the locating barrel, the annular impact member having two projecting blocks bilaterally disposed at one end, and a plurality of equiangularly spaced and longitudinally extended locating grooves on the inside respectively forced into engagement with the locating ribs of the body of the locating member, the projecting blocks of the annular impact member being turned with the annular impact member to strike the projecting blocks of the nut when the transmission block is rotated, causing the nut to be fastened tight with threaded portions of the clamping rods.

12 Claims, 16 Drawing Sheets

AUTO-LOCKING BIT HOLDING SYSTEM OF A HAND TOOL

BACKGROUND OF THE INVENTION

The present invention relates to a bit holding system for an electric hand tool for example an electric hand drill, and more particularly to an auto-locking bit holding system which automatically locks the bit when the electric hand tool is operated.

FIG. 1 shows a bit holding system for an electric hand tool according to the prior art. This structure of bit holding system comprises a hollow cylindrical transmission block having a rear end thereof fixedly connected to one end of the transmission shaft of the electric hand tool and a plurality of through holes spaced around the periphery, a plurality of clamping rods respectively obliquely inserted through the through holes on the hollow cylindrical transmission block and forced to hold down the bit being inserted into the hollow transmission block, the clamping rods each having a threaded portion at an outer side outside the hollow cylindrical transmission block, a nut having a tapered screw hole threaded onto the threaded portions of the clamping rods, a shell covered around the hollow cylindrical transmission block and the nut, and a locating barrel fastened to the shell to stop the nut inside the shell. When the shell is compressed with the hand and then turned, the nut is turned with the shell relative to the clamping rods to hold down or release the clamping rods. This structure of bit holding system is still not satisfactory in function. This structure of bit holding system is that the shell is not convenient in use because the shell must be turned by hand when holding down or releasing the clamping rods. Another drawback of this structure of bit holding system is that iron chips from the workpiece tends to be gathered at the shell because the shell is rotated with the transmission block during the operation of the electric hand tool, therefore the user's hand tends to be injured by iron chips gathered at the shell. Furthermore, because vibration waves are transmitted from the bit to the clamping rods, the transmission block and the nut during the operation of the electric hand tool, the tapered screw hole of the nut and the threaded portions of the clamping rods tend to be damaged.

SUMMARY OF THE INVENTION

The present invention has been accomplished to provide an auto-locking bit holding system which eliminates the aforesaid drawbacks. It is one object of the present invention to provide an auto-locking bit holding system which automatically locks the bit when the electric hand tool is operated, enabling the bit to be turned with the transmission shaft of the electric hand tool. It is another object of the present invention to provide an auto-locking bit holding system which provides a continuous impact operation mode and a non-continuous impact operation mode. According to one aspect of the present invention, an annular impact member is mounted around the cylindrical transmission block within the shell between the nut and the locating barrel. The annular impact member is forced to strike the nut when the transmission shaft of the electric hand tool is rotated, thereby causing the nut and the camping rods to be fastened up tightly. According to another aspect of the present invention, a clutch is provided for connecting/disconnecting the shell and the housing of the electric hand tool, enabling the nut and the annular impact member to be connected together for the continuous impact operation mode, or disconnected from each other for the non-continuous impact operation mode.

DETAILED DESCRIPTION OF THE PREFERRED EMBODIMENT

Figure 1:
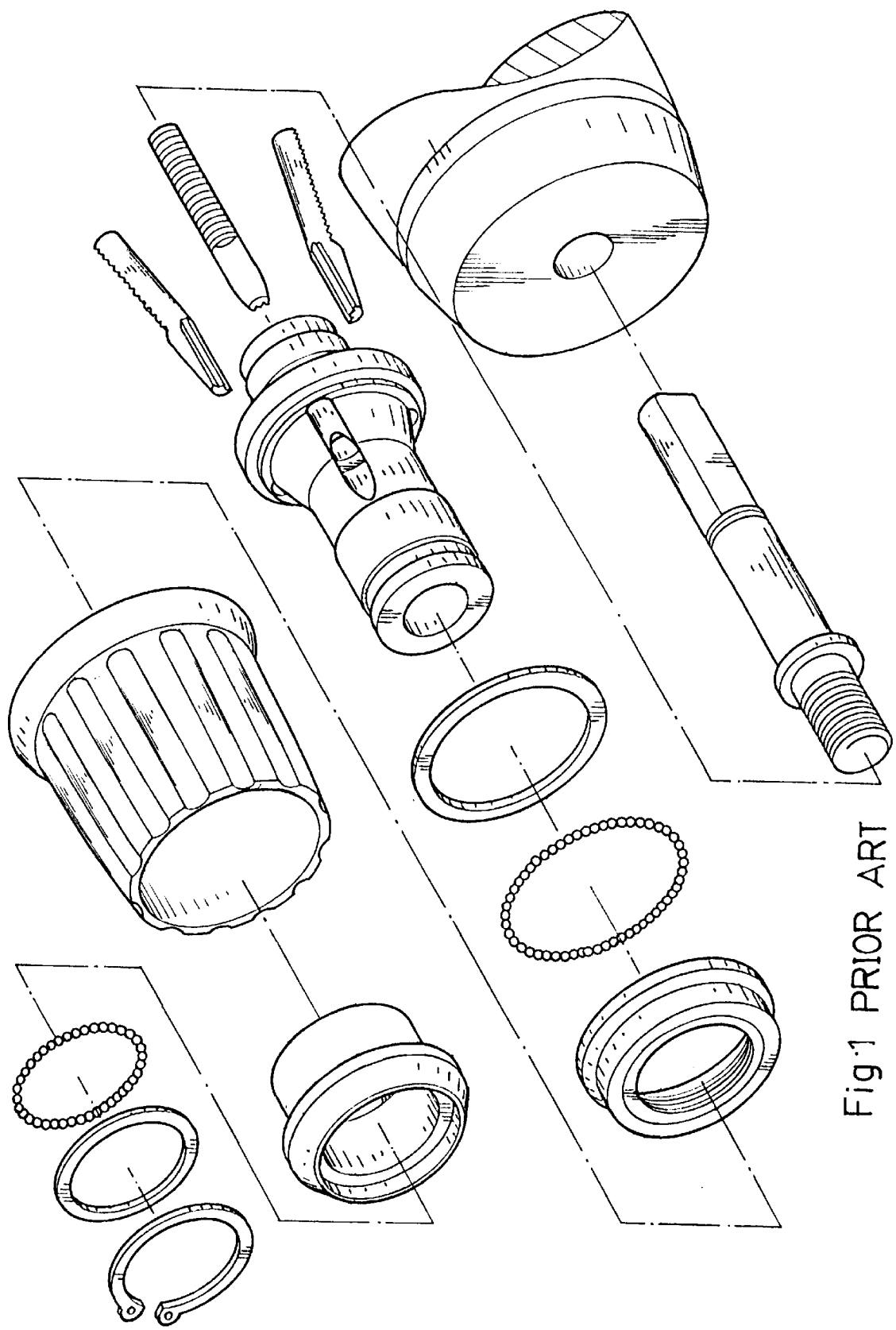
FIG. 1 is an exploded view of a bit holding system for an electric hand tool according to the prior art.
Figure 2:
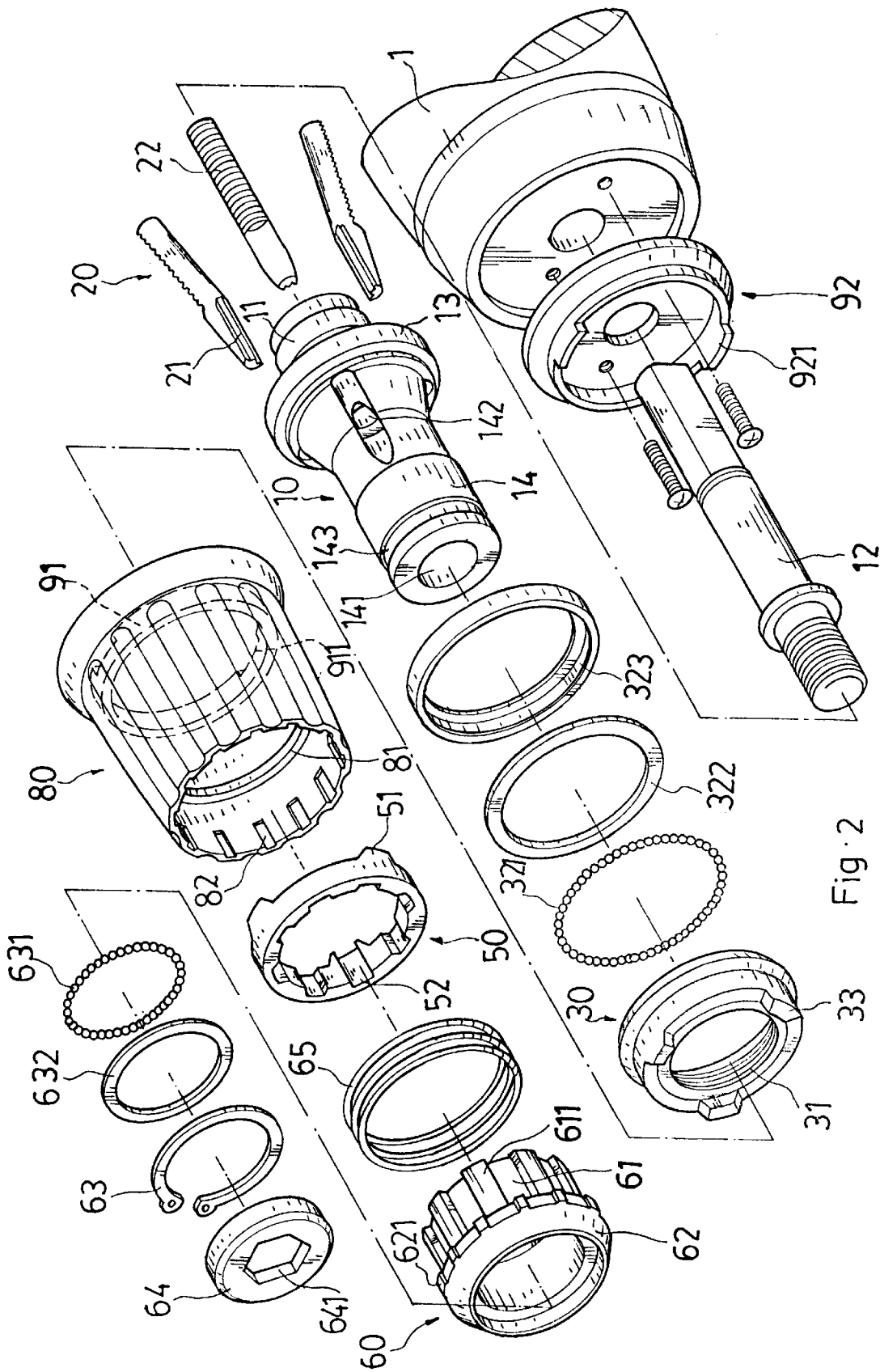
FIG. 2 is an exploded view of a bit holding system for an electric hand tool according to a first embodiment of the present invention.
Figure 3:
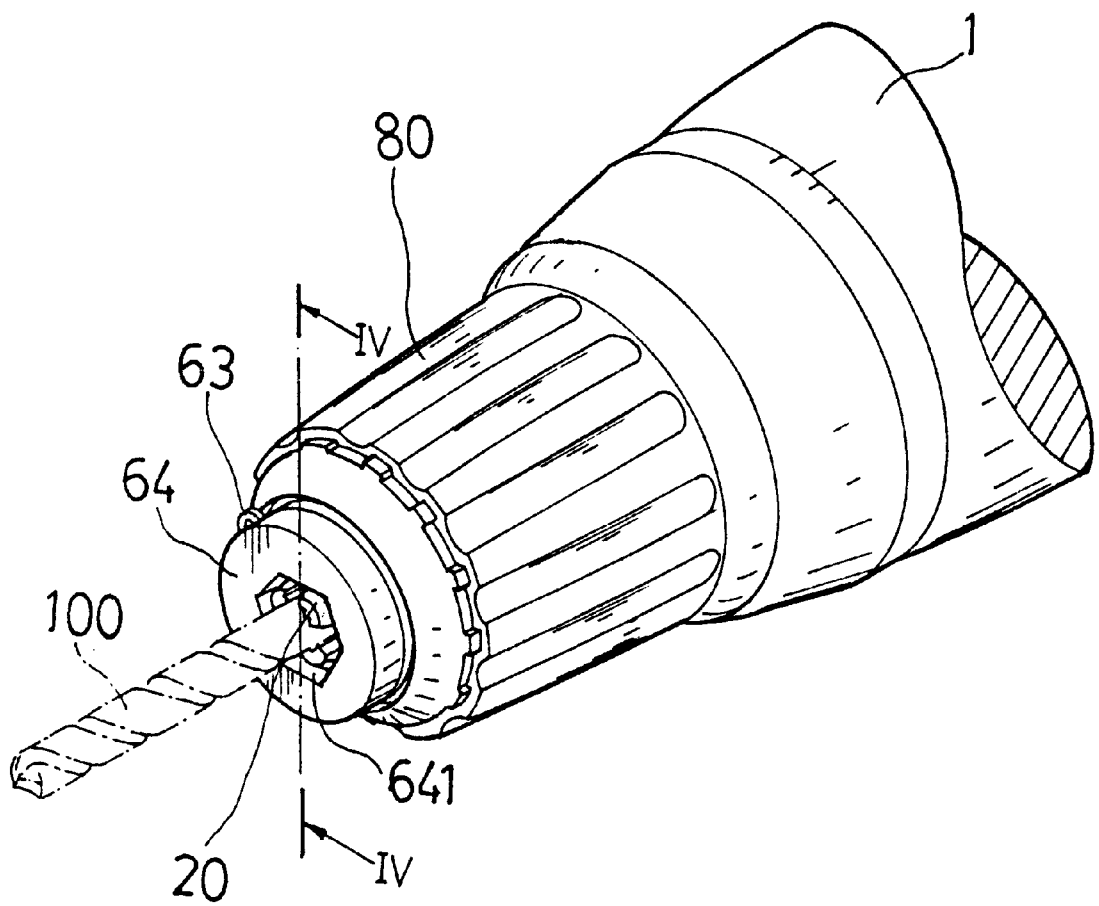
FIG. 3 is an assembly view of the bit holding system shown in FIG. 2.
Figure 4:
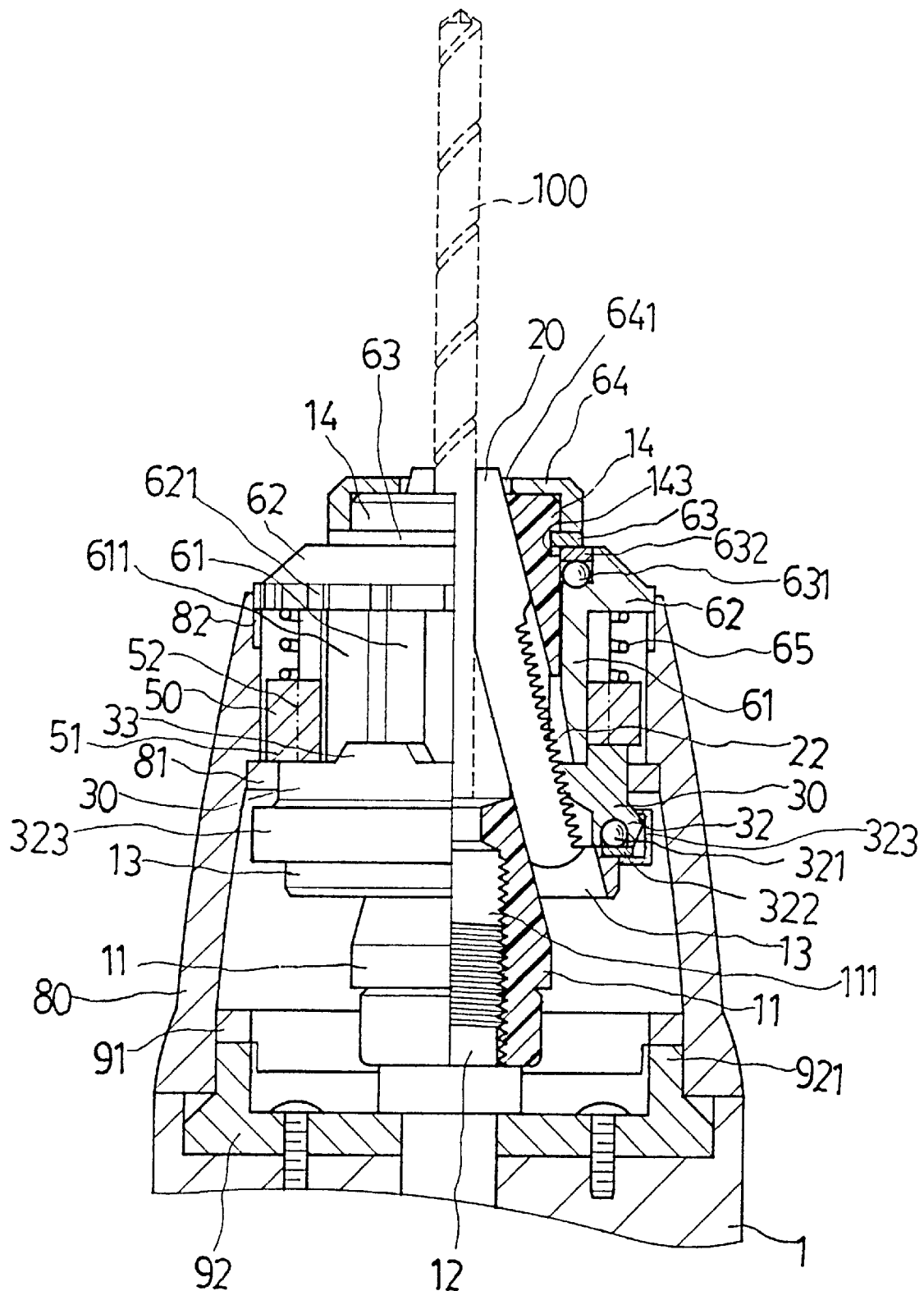
FIG. 4 is a sectional view taken along line 4—4 of FIG. 3.
Figure 5:
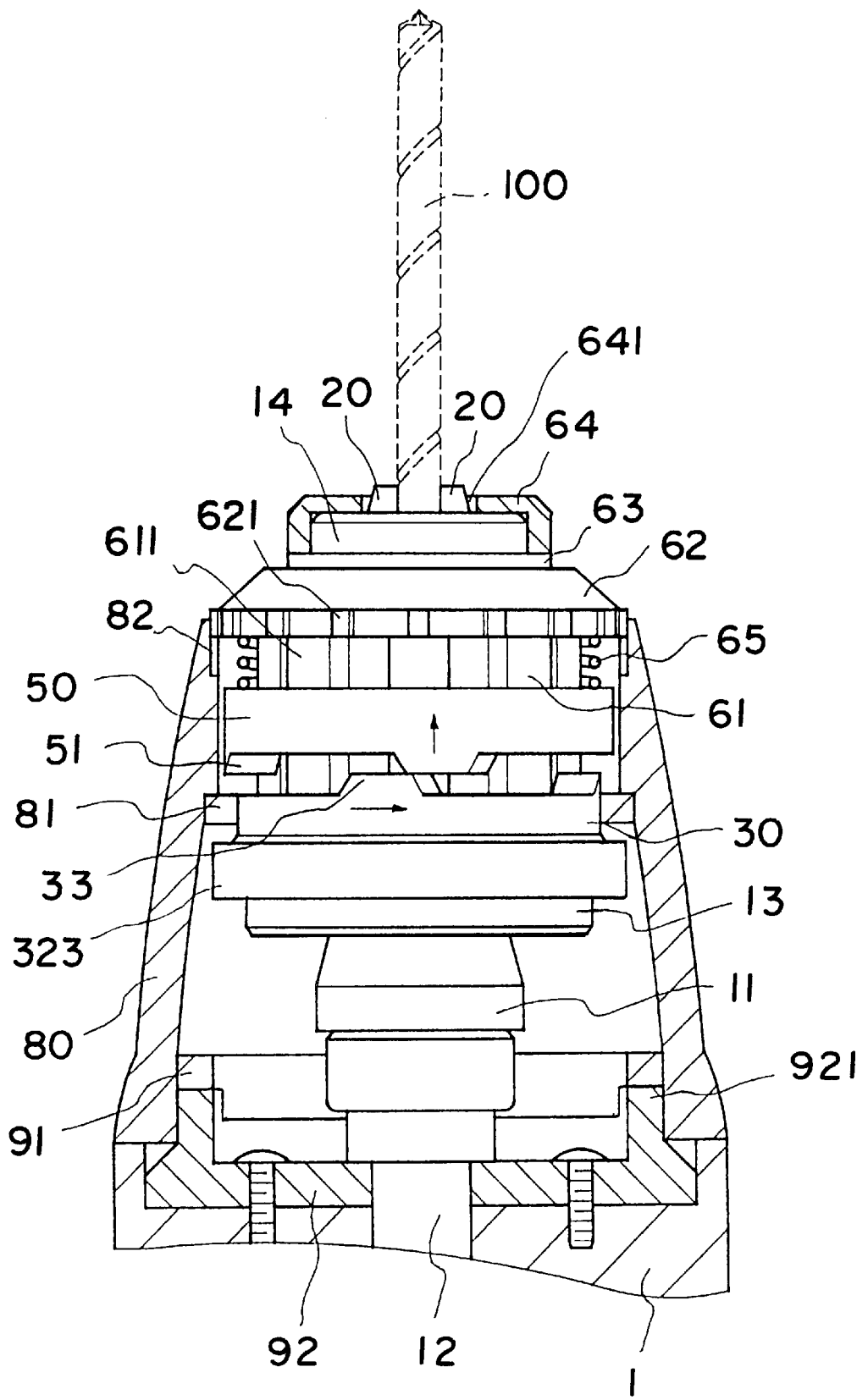
FIG. 5 is a sectional view of the first embodiment of the present invention showing the bit holding system operated.
Figure 6:
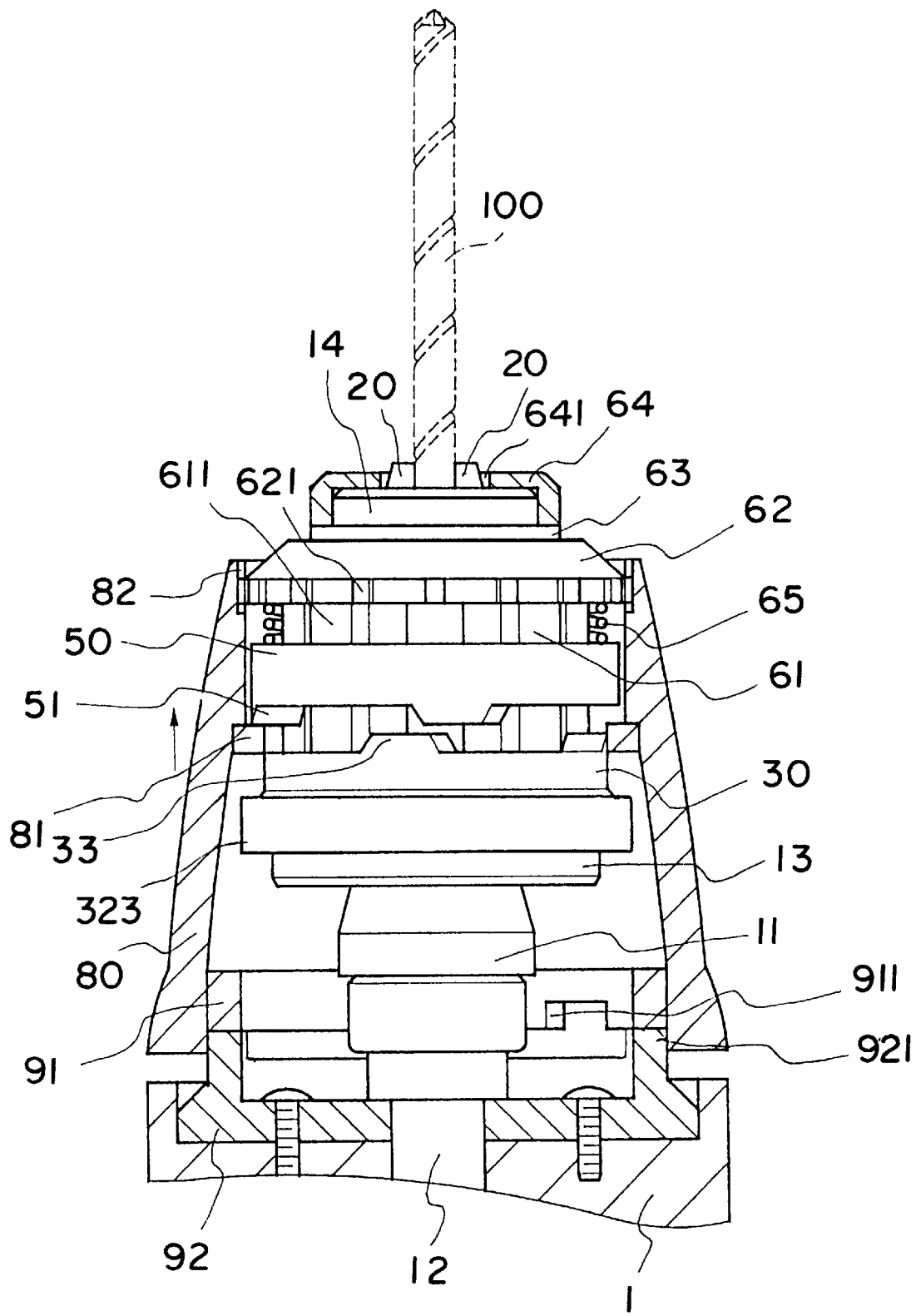
FIG. 6 is similar to FIG. 5 but showing the clutch closed.

Referring to FIGS. from 2 to 6, an auto-locking bit holding system in accordance with a first embodiment of the present invention is generally comprised of a cylindrical transmission block 10, a plurality of clamping rods 20, a nut 30, an annular impact member 50, a locating barrel 60, a shell 80, and clutch means.

The cylindrical transmission block 10 comprises a coupling portion 11 at one end, a cylindrical block body 14 at an opposite end in longitudinal alignment with the coupling portion 11, and a collar 13 raised around the periphery between the coupling portion 11 and the cylindrical block body 14. The coupling portion 11 defines a longitudinal mounting hole 111, which receives one end of a transmission shaft 12, which extends out of the housing of an electric hand drill 1, enabling the transmission block 10 to be rotated with the transmission shaft 12. The cylindrical block body 14 comprises a circular longitudinal coupling hole 141, an annular locating groove 143 around the periphery on the middle, a plurality of oblique through holes 142 equiangularly spaced around the periphery between the annular locating groove 142 and the collar 13 and outwardly backwardly extended from the circular longitudinal coupling hole 141.

The clamping rods 20 are respectively inserted into the oblique through holes 142 on the cylindrical block body 14 of the transmission block 10. Each clamping rod 20 has a clamping face 21 at one end, and a threaded portion 22 at an opposite end. When installed, the clamping face 21 of each clamping rod 20 faces the center of the circular longitudinal coupling hole 141, and the threaded portion 22 of each clamping rod 20 is disposed outside the block body 14.

The nut 30 has a tapered screw hole 31 for engagement with the threaded portions 22 of the clamping rod 20, a recessed chamber 32 at a rear side thereof, and a plurality of equiangularly spaced projecting blocks 33 at a front side thereof. Each projecting block 33 has two downwardly outwardly extended sloping side walls. The recessed chamber 32 of the nut 30 receives a ball bearing 321 and a cushion ring 322. A cap ring 323 is fastened to the nut 30 to hold the cushion ring 322 and the ball bearing 321 in the recessed chamber 32.

The annular impact member 50 is mounted around the cylindrical transmission block 10, having a plurality of equiangularly spaced projecting blocks 51 at a rear side thereof corresponding to the projecting blocks 33 of the nut 30, and a plurality of equiangularly spaced and longitudinally extended locating grooves 52 on the inside.

The locating barrel 60 is a tubular member mounted around the block body 14 of the cylindrical transmission block 10, comprised of a body 61 and a head 62 raised around the body 61 at one end. The body 61 has a plurality of longitudinal locating ribs 611 equiangularly spaced around the periphery. The head 62 has a plurality of longitudinal locating ribs 621 equiangularly spaced around the periphery. When the locating barrel 60 is sleeved onto the block body 14 of the cylindrical transmission block 10, a retainer ring 63 is fastened to the annular locating groove 143 on the block body 14 of the cylindrical transmission block 10 to secure the locating barrel 60 in place. A ball bearing 631 and a cushion ring 632 are mounted around the block body 14 of the cylindrical transmission block 10 between the locating barrel 60 and the retainer ring 63. Further, a rust-resisting protective cap 64 is covered on the front end of the block body 14 of the cylindrical transmission block 10 around the longitudinal coupling hole 141. The rust-resisting protective cap 64 has a hexagonal center hole 641 through which the rust-resisting protective cap 64 can be turned with a wrench to fasten up the transmission block 10 and the transmission shaft 12.

The shell 80 is a hollow conical member. The both ends of the shell 80 are opened. The shell 80 comprises a plurality of longitudinal coupling grooves 82 equiangularly spaced around the inside wall thereof at one end for engagement with the locating ribs 621 of the head 62 of the locating barrel 60, and an inside annular flange 81 raised around the inside wall for acting with the annular impact member 50.

The clutch means is comprised of an annular coupling member 91, and a coupling cap 92. The annular coupling member 91 is mounted inside the shell 80 at one end remote from the longitudinal coupling grooves 82 of the shell 80, having a plurality of equiangularly spaced bottom notches 911. The coupling cap 92 is fixedly fastened to the housing of the electric hand drill 1, having a plurality of equiangularly spaced and forwardly extended locating rods 921 for engagement with the bottom notches 911 on the annular coupling member 91.

By means of controlling the engagement between the annular coupling member 91 and the coupling cap 92 to connect/disconnect the impact member 50 and the nut 30, the invention is alternatively set between two operation modes, namely, the continuous impact operation mode and the non-continuous impact operation mode. When the shell 80 is rotated to force the locating rods 921 of the coupling cap 92 into engagement with the bottom notches 911 on the annular coupling member 91, the projecting blocks 51 of the annular impact member 50 are forced into contact with the projecting blocks 33 of the nut 30. When the transmission shaft 12 is rotated, the projecting blocks 51 are moved up and down with the annular impact member 50 to strike the projecting blocks 33 of the nut 30, causing a heavy torsional force to be intermittently produced. When the nut 20 is continuously stricken, the engagement between the tapered screw hole 31 and the threaded portions 22 of the clamping rods 20 is tightened up, thereby causing the bit 100 to be firmly secured in the longitudinal coupling hole 141 of the transmission block 10 by the clamping faces 21 of the clamping rods 20. On the contrary, when the shell 80 is moved forwards, the bottom notches 911 of the annular coupling member 91 are disengaged from the locating rods 921 of the coupling cap 92, and the annular impact member 50 is forced away from the nut 30 by the inside annular flange 81 of the shell 80, therefore a gap is left between the annular impact member 50 and the nut 30. When the transmission shaft 12 is rotated at this stage, the projecting blocks 51 of the annular impact member 50 do not strike the projecting blocks 33 of the nut 30, therefore the transmission shaft 12 is continuously rotated at a constant speed.

Figure 7:
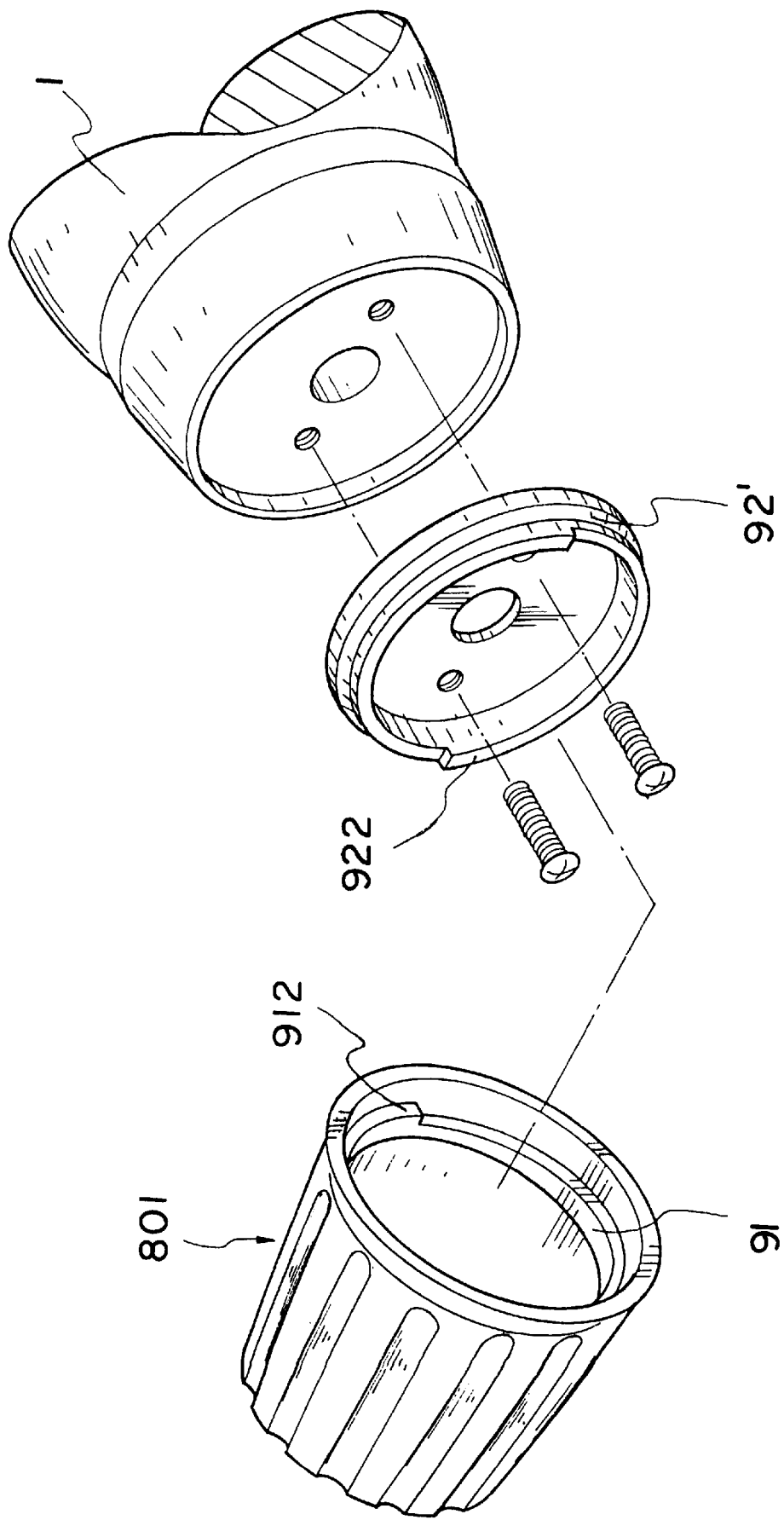
FIG. 7 is shows an alternate form of the clutch according to the present invention.
Figure 8:
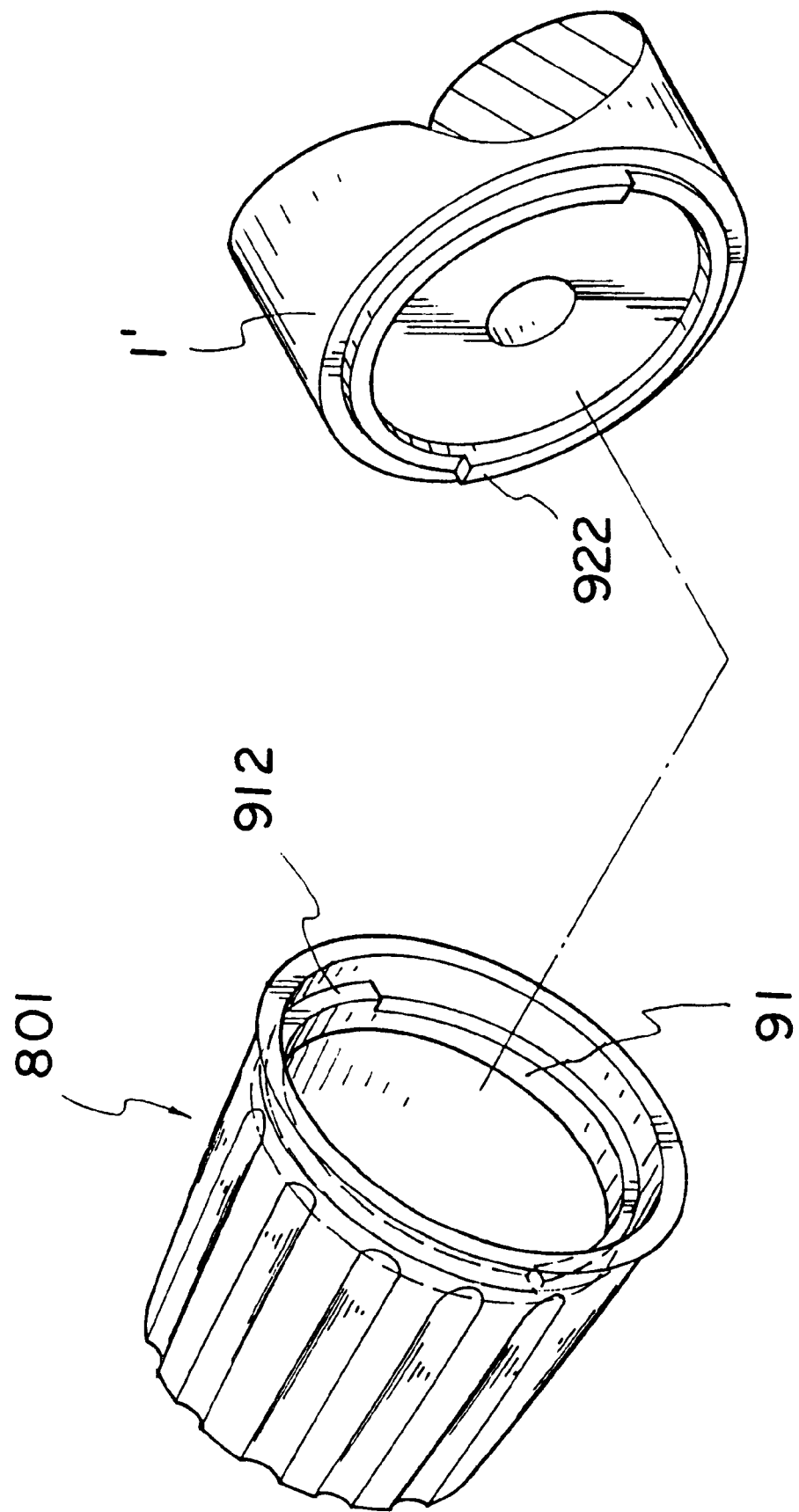
FIG. 8 shows another alternate form of the clutch according to the present invention.
Figure 9:
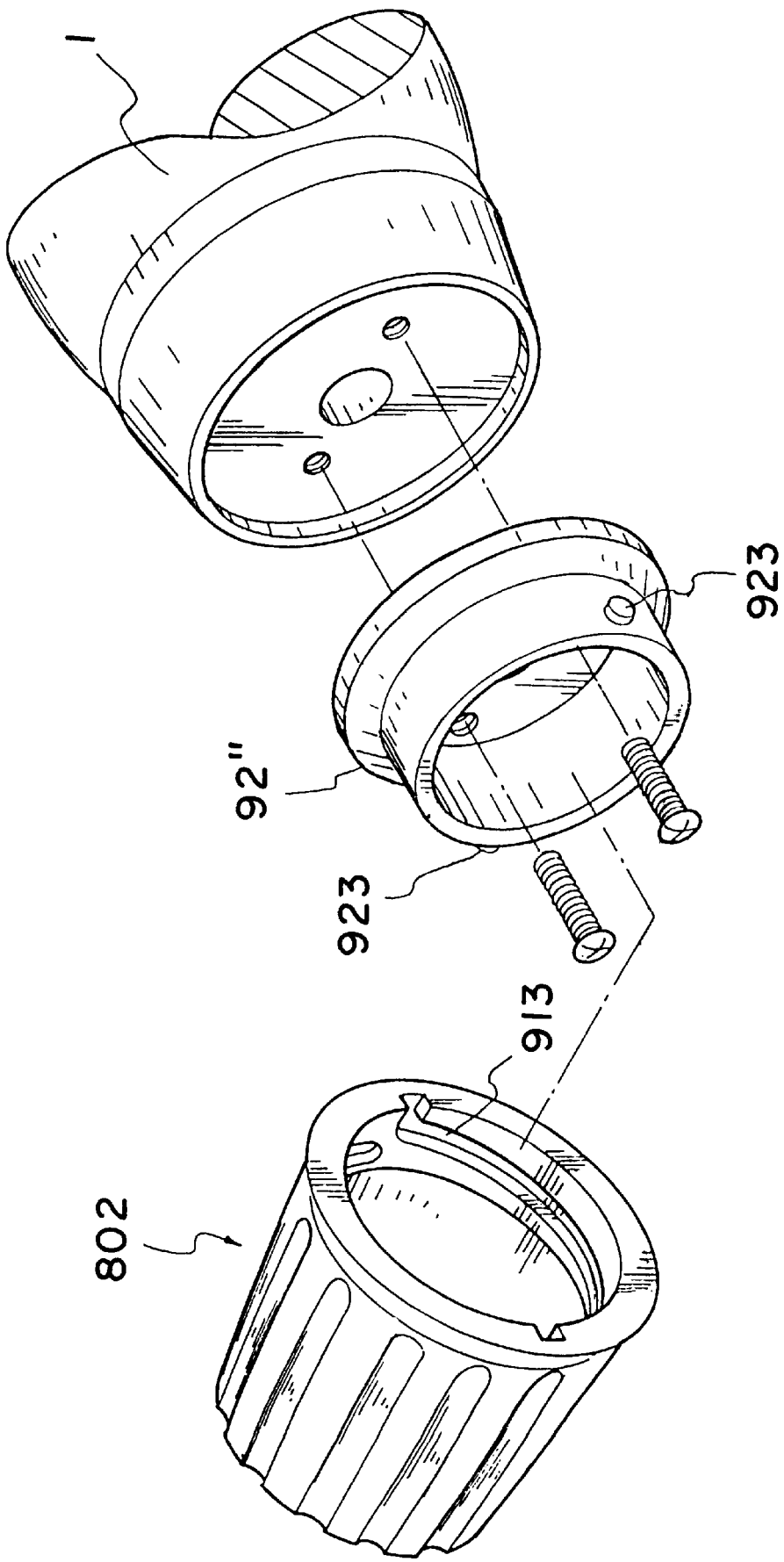
FIG. 9 shows still another alternate form of the clutch according to the present invention.
Figure 10:
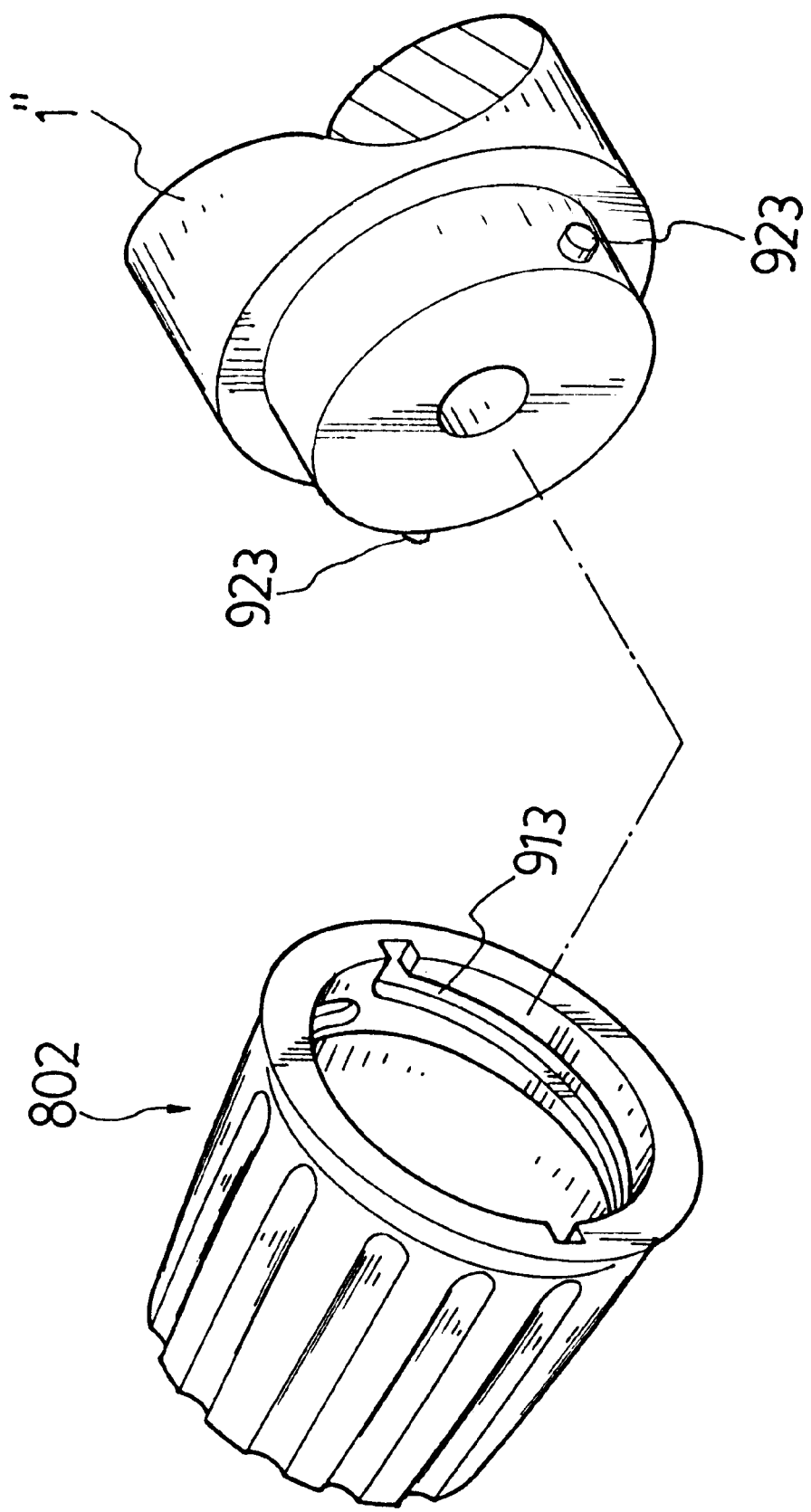
FIG. 10 shows still another alternate form of the clutch according to the present invention.
Figure 11:
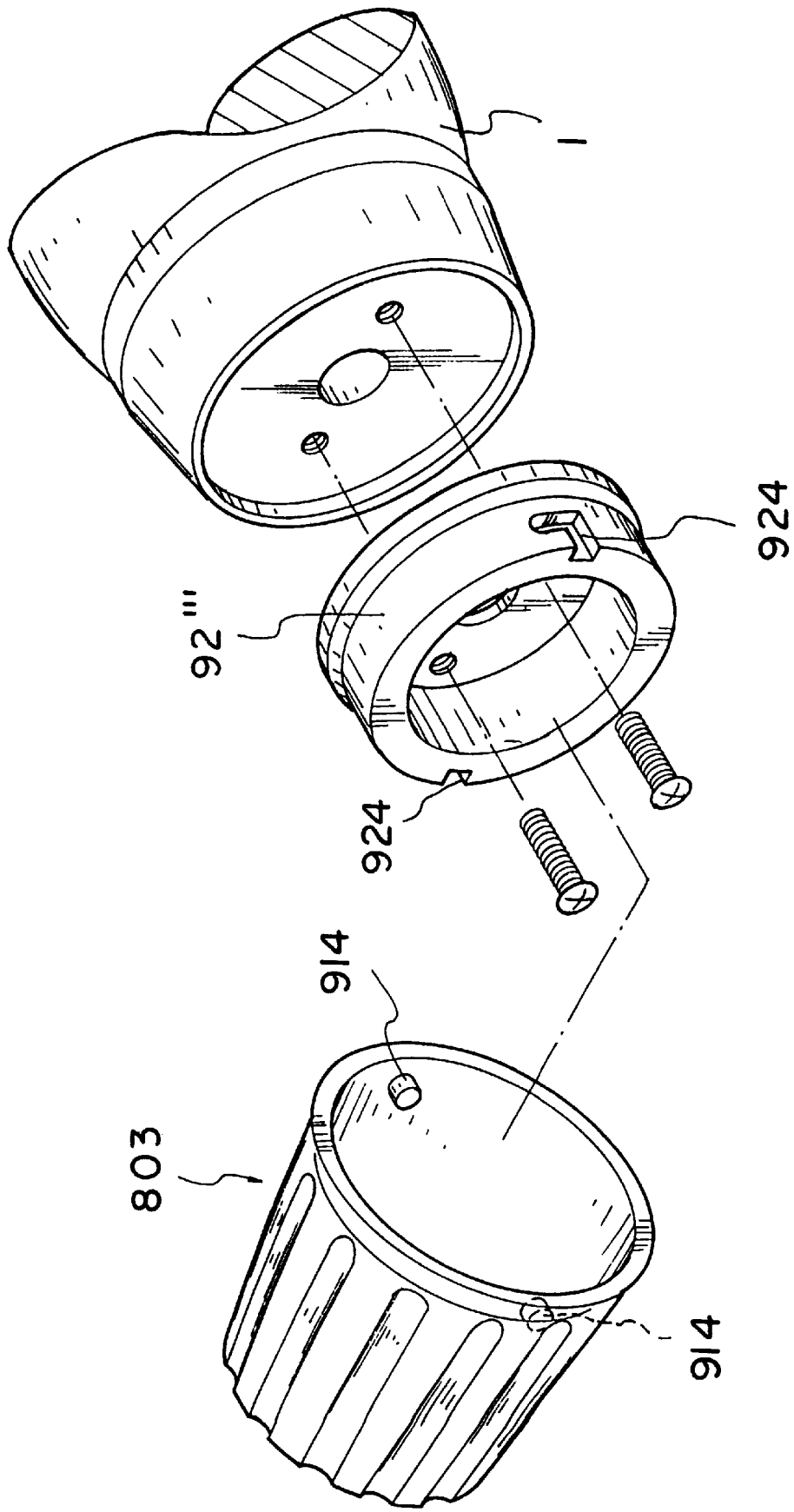
FIG. 11 shows still another alternate form of the clutch according to the present invention.
Figure 12:
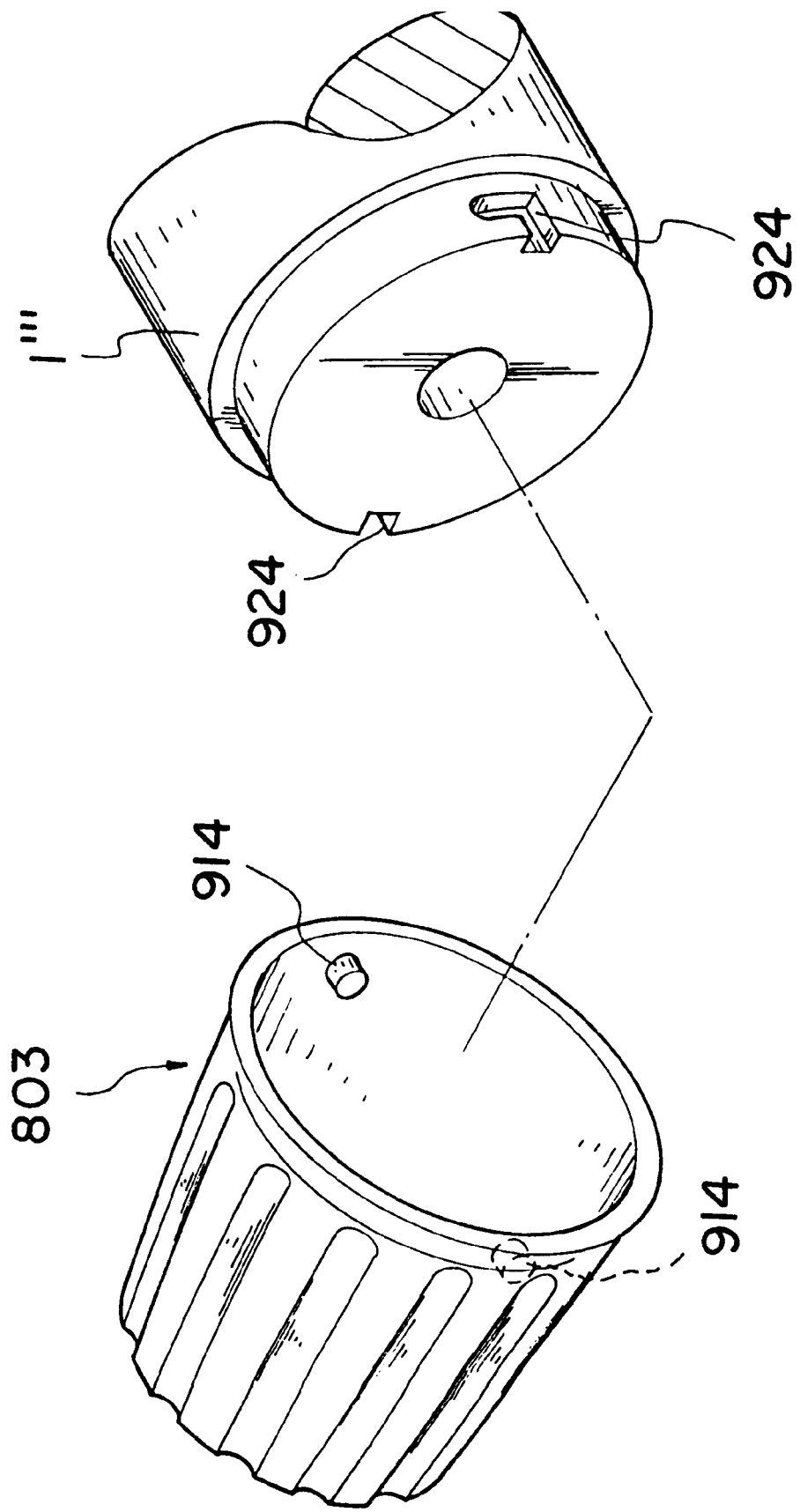
FIG. 12 shows still another alternate form of the clutch according to the present invention.

The aforesaid clutch can be made in any of the following different forms:

1. In the form of FIG. 7, the annular coupling member 91 has two reversely spirally disposed sloping edges 912, the coupling cap 92' has two reversely spirally disposed sloping edges 922 for engagement with the sloping edges 912 of the annular coupling member 91. The annular coupling member 91 and the coupling cap 92' are fastened together when the shell 801 is rotated in one direction relative to the coupling cap 92'. On the contrary, the annular coupling member 91 and the coupling cap 92' are disconnected when the shell 801 is rotated in the reversed direction relative to the coupling cap 92'. Further, the reversed sloping edges 922 may be integral with the housing of the electric hand drill 1', as shown in FIG. 8.
2. In the form of FIG. 9, the clutch is comprised of a spiral coupling groove 913 on the inside wall of the shell 802 at one end, and a coupling cap 92" fixedly fastened to the housing of the electric hand drill 1, the coupling cap 92" having two coupling rods 923 raised from the periphery at two opposite sides and respectively coupled to the spiral coupling groove 913 inside the shell 802. Further, the coupling rods 923 may be directly integral with the front end of the housing of the electric hand drill 1", as shown in FIG. 10.
3. In the form of FIG. 1, the clutch comprises two coupling rods 914 bilaterally raised from the inside wall of the shell 803, and a coupling cap 92''' fixedly fastened to the housing of the electric hand drill 1, the coupling cap 92''' having two L-shaped coupling grooves 924 at two opposite sides for engagement with the coupling rods 914. When the shell 803 is pushed backwards and rotated in one direction, the coupling rods 914 are respectively engaged with the L-shaped coupling grooves 924. On the contrary, when the shell 803 is rotated in the reversed direction and pushed forwards, the coupling rods 914 are disengaged from the L-shaped coupling grooves 924. Further, the L-shaped coupling grooves 924 can be directly integral with the housing of the electric hand drill 1''', as shown in FIG. 12.

Figure 13:
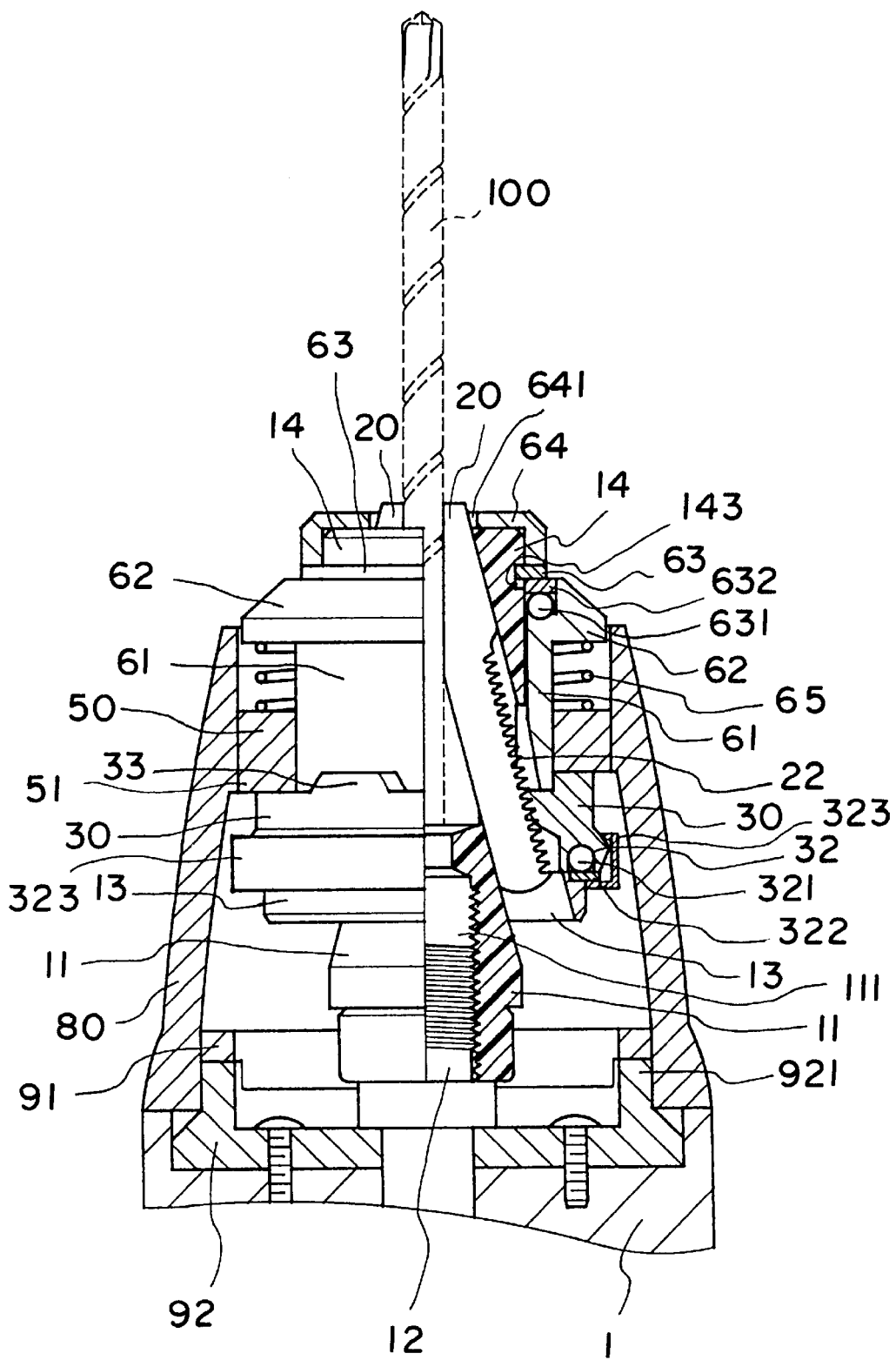
FIG. 13 is a sectional view of an alternate form of the auto-locking bit holding system according to the present invention.
Figure 14:
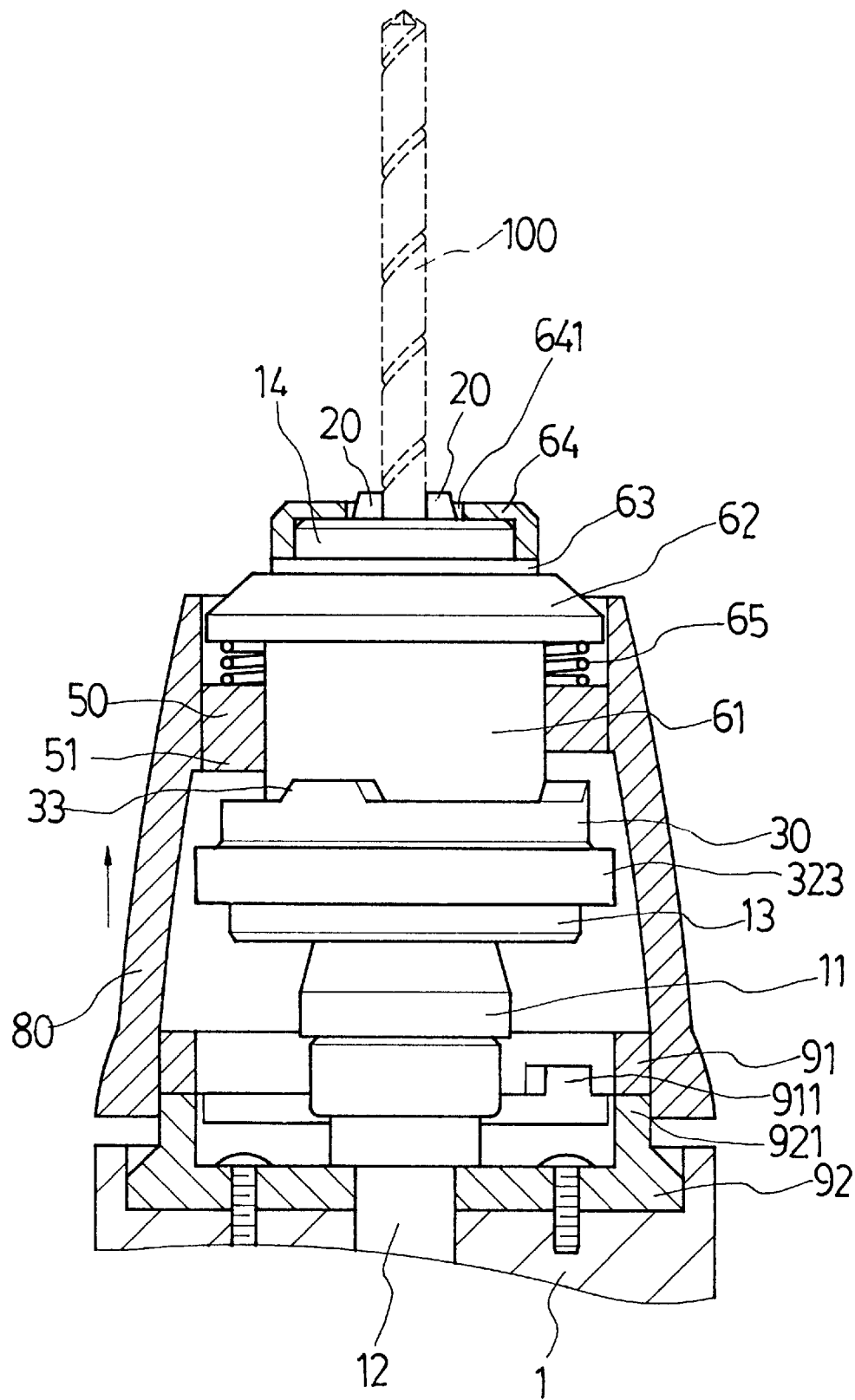
FIG. 14 is similar to FIG. 13 but showing the clutch closed.

FIGS. 13 and 14 show an alternate form of the autolocking bit holding down system according to the present invention. According to this alternate form, the annular impact member is fixedly mounted inside the shell 80. This alternate form eliminates the inside annular flange 81 from the shell 80, the longitudinal locating ribs 611 from the body 61 of the locating barrel 60 and the longitudinal coupling grooves 52 from the annular impact member 50. By means of moving the shell 80, the annular impact member 50 is connected to or disengaged from the nut 30.

Figure 15:
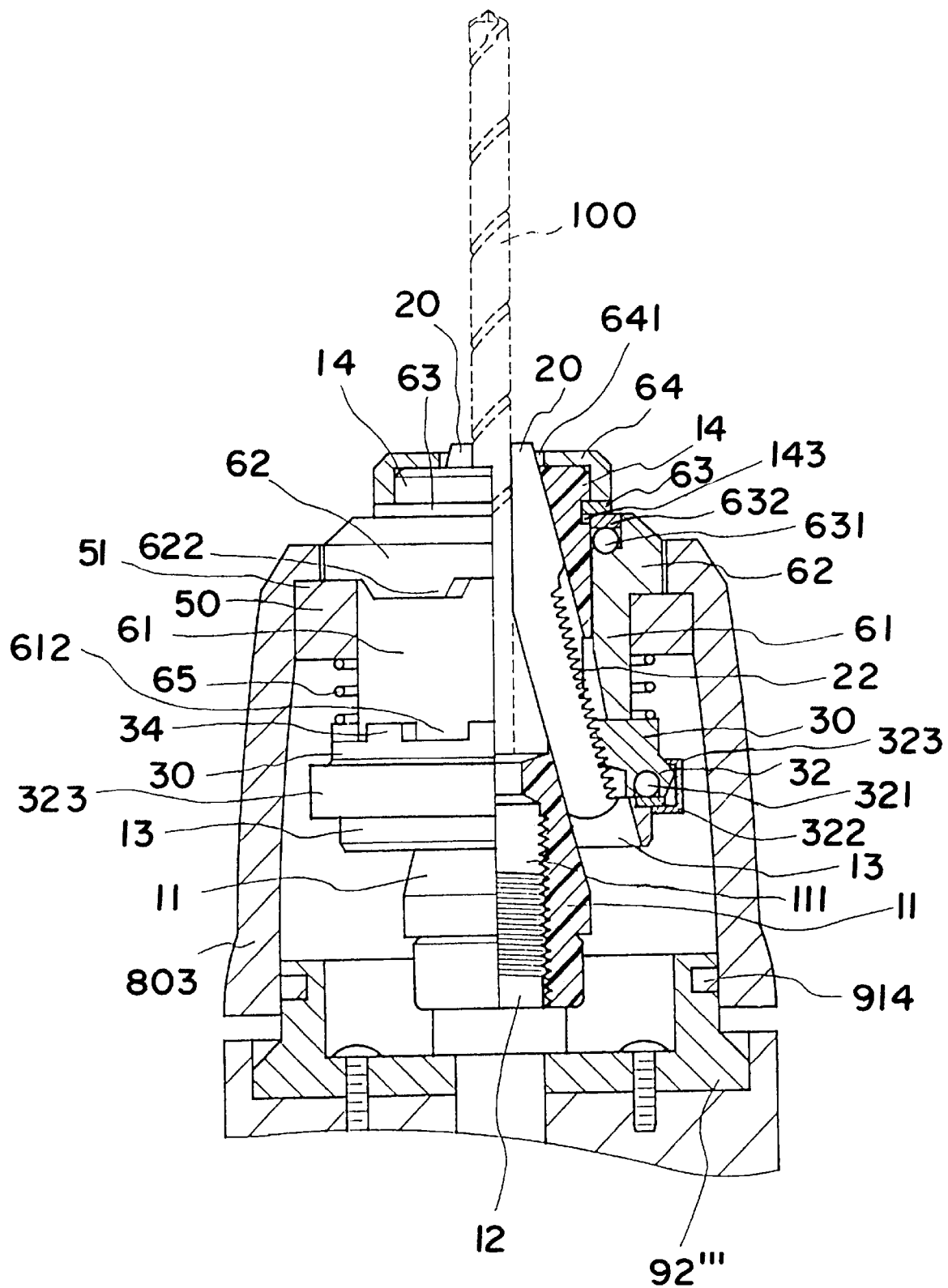
FIG. 15 is a sectional view of another alternate form of the auto-locking bit holding system according to the present invention.
Figure 16:
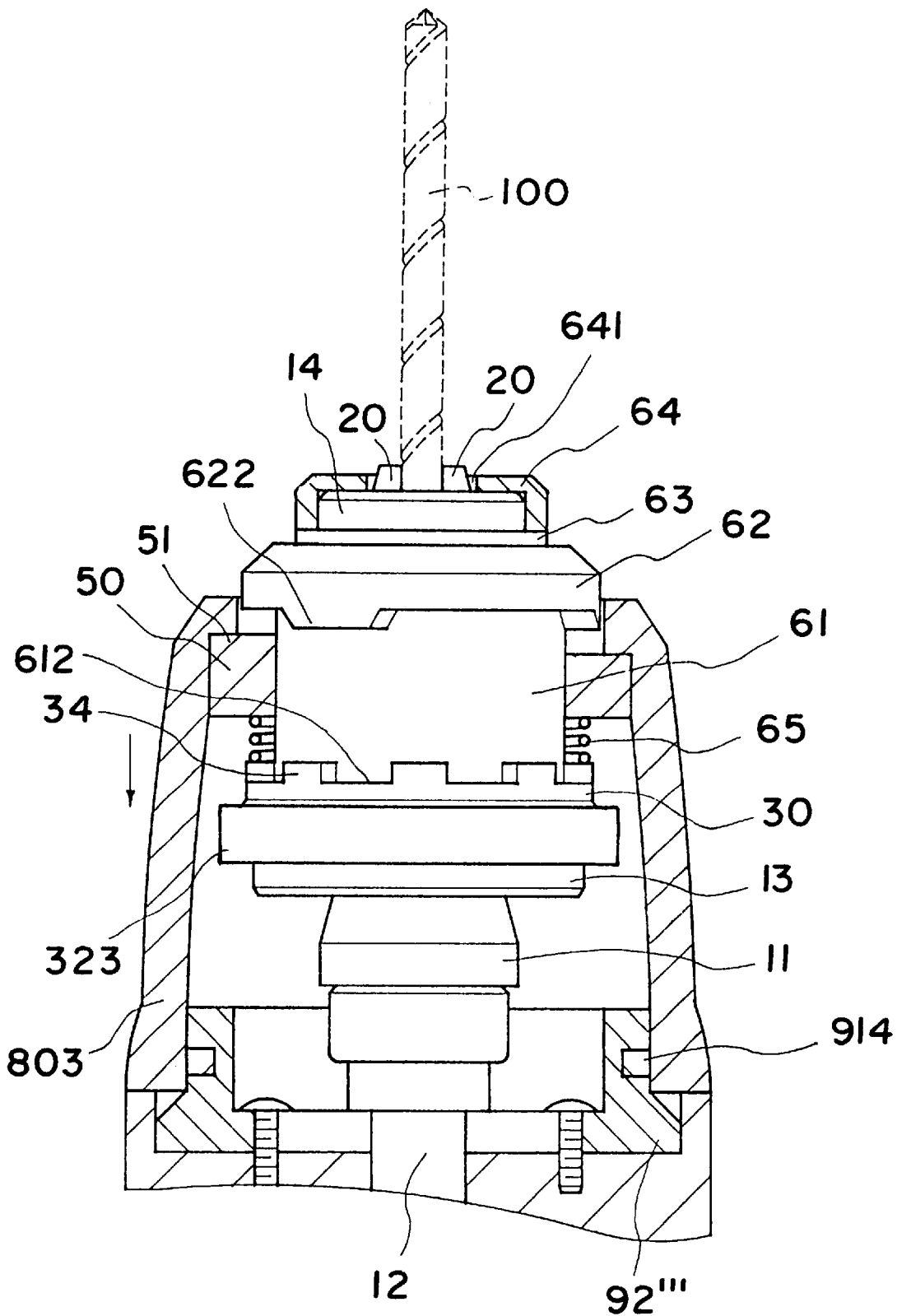
FIG. 16 is similar to FIG. 15 but showing the clutch closed.

FIGS. 15 and 16 show another alternate form of the auto-locking bit holding down system according to the present invention. According to this alternate form, the annular impact member 50 is separated from the shell 80 and has a plurality of projecting blocks 51 at an outer side for acting against respective projecting blocks 622 at the head 62 of the locating barrel 60, the body 61 of the locating barrel 60 has a plurality of projecting blocks 612 for engagement with respective projecting blocks 34 at the nut 30, and a spring 65 is connected between the annular impact member 50 and the nut 30. When the transmission shaft 12 is rotated, the projecting blocks 622 of the head 62 of the locating barrel 60 are moved to strike the projecting blocks 51 of the annular impact member 50 repeatedly, thereby causing the annular impact member 50 to be alternatively moved up and down and therefore the clamping rods 20 are fastened tight.

What the invention claimed is:

1. An auto-locking bit holding system installed in the housing of an electric hand tool to hold a bit, enabling the bit to be turned with the transmission shaft of the electric hand tool, comprising a hollow cylindrical transmission block having a rear end thereof fixedly connected to one end of the transmission shaft of the electric hand tool and a plurality of through holes spaced around a block body thereof, a plurality of clamping rods respectively obliquely inserted through the through holes on the block body of said hollow cylindrical transmission block and forced to hold down said bit, said clamping rods each having a threaded portion at an outer side outside said hollow cylindrical transmission block, a nut having a tapered screw hole threaded onto the threaded portions of said clamping rods, a shell covered around said hollow cylindrical transmission block and said nut, and a locating barrel fastened to a front end of said shell to stop said nut inside said shell, wherein:

said nut comprises two projecting blocks bilaterally axially extended from a front end thereof, said projecting blocks each having two downwardly outwardly extended sloping side walls; said locating member comprises a body and a plurality of longitudinal locating ribs equiangularly spaced around the periphery of the body; an annular impact member is mounted around said cylindrical transmission block within said shell between said nut and said locating barrel, said annular impact member having two projecting blocks bilaterally axially extended from a rear side thereof, and a plurality of equiangularly spaced and longitudinally extended locating grooves on the inside respectively forced into engagement with the locating ribs of the body of said locating barrel, the projecting blocks of said annular impact member being turned with said annular impact member to strike the projecting blocks of said nut when said transmission block is rotated, causing said nut to be fastened tight with the threaded portions of said clamping rods.

2. The auto-locking bit holding system of claim 1 further comprising a rust-resisting protective cap covered on the front end of the block body of said cylindrical transmission block in front of said locating barrel, said rust-resisting protective cap having a polygonal center through hole.

3. The auto-locking bit holding system of claim 1 wherein said shell comprises an inside annular flange raised around an inside wall thereof for acting with the annular impact member, and a plurality of equiangularly spaced, longitudinally extended coupling grooves on the inside for engagement with said locating barrel.

4. The auto-locking bit holding system of claim 3 wherein said locating barrel comprises a head at one end of the body thereof, and a plurality of locating ribs equiangularly spaced around the periphery of said head and respectively forced into engagement with the coupling grooves of said shell.

5. The auto-locking bit holding system of claim 1 further comprising clutch means for connecting/disconnecting said shell and the housing of the electric hand tool, said clutch means comprising an annular coupling member mounted inside said shell at one end, and a coupling cap fixedly fastened to a front end of the housing of the electric hand drill for engagement with said annular coupling member.

6. The auto-locking bit holding system of claim 5 wherein said annular coupling member comprises a plurality of equiangularly spaced bottom notches, and said coupling cap comprises a plurality of equiangularly spaced and forwardly extended locating rods for engagement with the bottom notches on said annular coupling member.

7. The auto-locking bit holding system of claim 1 further comprising spring means connected between said nut and said locating barrel to force said nut and said locating barrel apart.

8. The auto-locking bit holding system of claim 5 wherein said annular coupling member has two reversely spirally disposed sloping edges at an outer end, said coupling cap has two reversely spirally disposed sloping edges for engagement with the sloping edges of said annular coupling member.

9. The auto-locking bit holding system of claim 1 further comprising clutch means for connecting/disconnecting said shell and the housing of the electric hand tool, said clutch means comprising a spiral coupling groove on the inside of said shell at one end, and a coupling cap fixedly fastened to the housing of the electric hand drill, said coupling cap having two coupling rods raised from the periphery at two opposite sides and respectively coupled to said spiral coupling groove inside said shell.

10. The auto-locking bit holding system of claim 1 further comprising clutch means for connecting/disconnecting said shell and the housing of the electric hand tool, said clutch means comprising two coupling rods bilaterally integral with said shell on the inside, and a coupling cap fixedly fastened to the housing of the electric hand drill, said coupling cap having two L-shaped coupling grooves at two opposite sides for engagement with said coupling rods.

11. The auto-locking bit holding system of claim 1 wherein said annular impact member is integral with said shell on the inside.

12. An auto-locking bit holding system installed in the housing of an electric hand tool to hold a bit, enabling the bit to be turned with the transmission shaft of the electric hand tool, comprising a hollow cylindrical transmission block having a rear end thereof fixedly connected to one end of the transmission shaft of the electric hand tool and a plurality of through holes spaced around a block body thereof, a plurality of clamping rods respectively obliquely inserted through the through holes on the block body of said hollow cylindrical transmission block and forced to hold down said bit, said clamping rods each having a threaded portion at an outer side outside said hollow cylindrical transmission block, a nut having a tapered screw hole threaded onto the threaded portions of said clamping rods, a shell covered around said hollow cylindrical transmission block and said nut, and a locating barrel fastened to a front end of said shell to stop said nut inside said shell, wherein: said nut comprises a plurality of projecting blocks for engagement with said locating barrel; an annular impact member is mounted around said cylindrical transmission block within said shell between said nut and said locating barrel, said annular impact member has a plurality of projecting blocks at an outer side for acting against respective projecting blocks at said locating barrel, said locating barrel comprises a body and a head at one end of the body, the head of said locating barrel having a plurality of projecting blocks for acting against the projecting blocks of said annular impact member, the body of said locating barrel having a plurality of projecting blocks for engagement with respective projecting blocks at said nut; a spring is mounted within said shell and connected between said annular impact member and said nut to force said annular impact member and said nut apart.

* * * * *